(12) United States Patent
Wehbe

(10) Patent No.: US 10,620,506 B2
(45) Date of Patent: Apr. 14, 2020

(54) PORTABLE DEVICE FOR CONTROLLING PHOTOGRAPHY LIGHTING

(71) Applicant: Christina Wehbe, Chicago, IL (US)

(72) Inventor: Christina Wehbe, Chicago, IL (US)

( * ) Notice: Subject to any disclaimer, the term of this patent is extended or adjusted under 35 U.S.C. 154(b) by 0 days.

(21) Appl. No.: 16/146,902

(22) Filed: Sep. 28, 2018

(65) Prior Publication Data

US 2019/0101809 A1    Apr. 4, 2019

Related U.S. Application Data

(60) Provisional application No. 62/565,517, filed on Sep. 29, 2017.

(51) Int. Cl.
G03B 15/06 (2006.01)

(52) U.S. Cl.
CPC .................... *G03B 15/06* (2013.01)

(58) Field of Classification Search
None
See application file for complete search history.

(56) References Cited

U.S. PATENT DOCUMENTS

| | | | | |
|---|---|---|---|---|
| 1,662,586 A | * | 3/1928 | Newman | G03B 21/58 160/351 |
| 6,322,235 B1 | * | 11/2001 | Strobel | G03B 15/06 362/16 |
| 6,474,021 B2 | * | 11/2002 | Homeyer | A47D 7/002 160/372 |
| 8,024,881 B2 | | 9/2011 | Redmon | |
| 9,051,751 B2 | * | 6/2015 | Ogilvie | E04H 15/005 |
| 2005/0200951 A1 | * | 9/2005 | Redmon | G09F 1/12 359/443 |
| 2016/0109682 A1 | * | 4/2016 | Shen | G03B 15/06 359/871 |
| 2019/0032361 A1 | * | 1/2019 | Brian | E04H 15/48 |
| 2019/0101809 A1 | * | 4/2019 | Wehbe | G03B 15/06 |

* cited by examiner

*Primary Examiner* — William B Perkey
(74) *Attorney, Agent, or Firm* — Miller Canfield Paddock and Stone; Mark L Maki

(57) ABSTRACT

The present invention is directed to a device for controlling photography lighting. The device comprises a collapsible frame and a removable fabric. The collapsible frame comprises a plurality of frame segments alternating with a plurality of hinges to form a loop. Each of the plurality of hinges includes a corresponding lock to lock the hinge at an angle. The removable fabric may be attached to a plurality of attachment points along the frame when each of the plurality of locks is in the locked position.

13 Claims, 15 Drawing Sheets

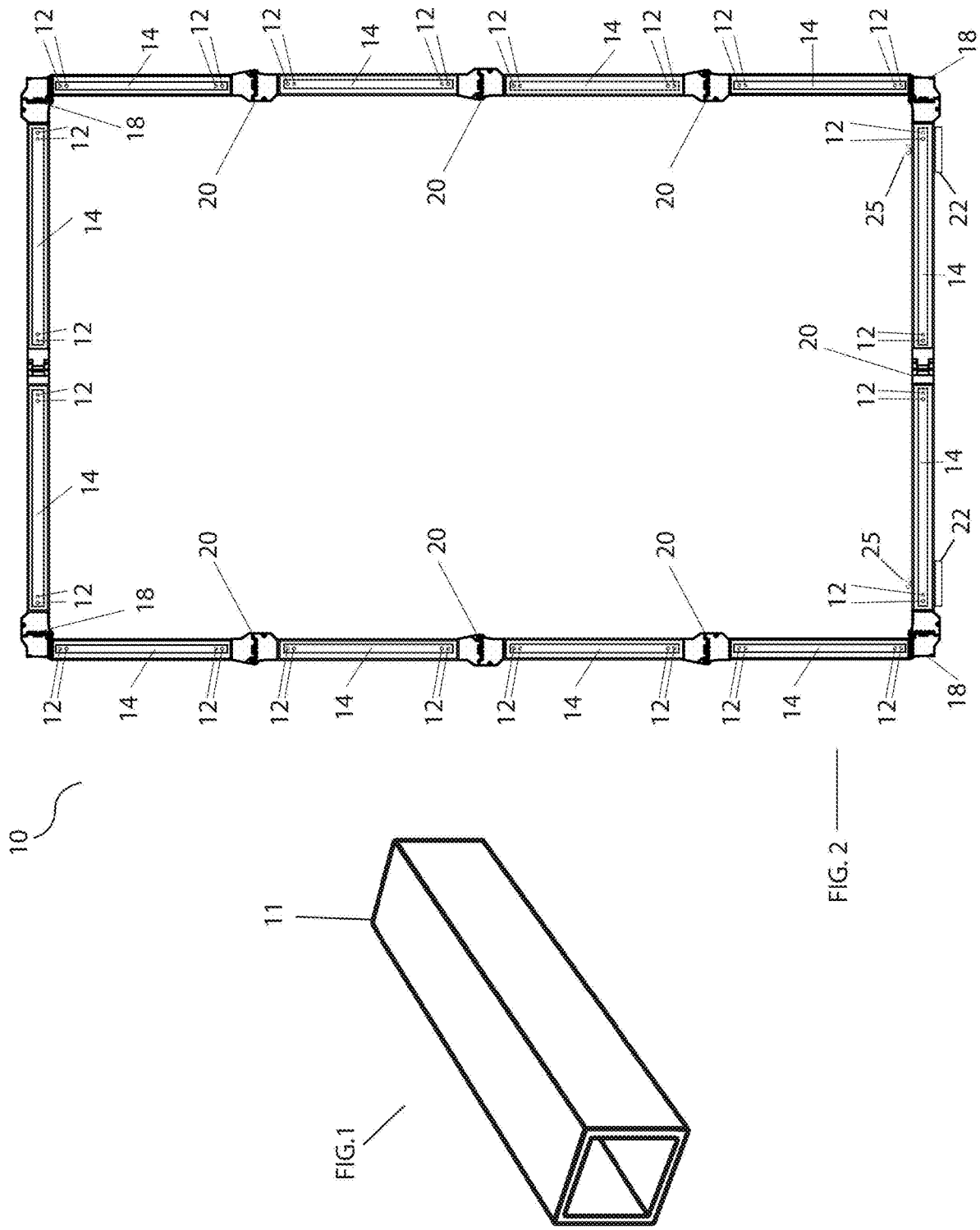

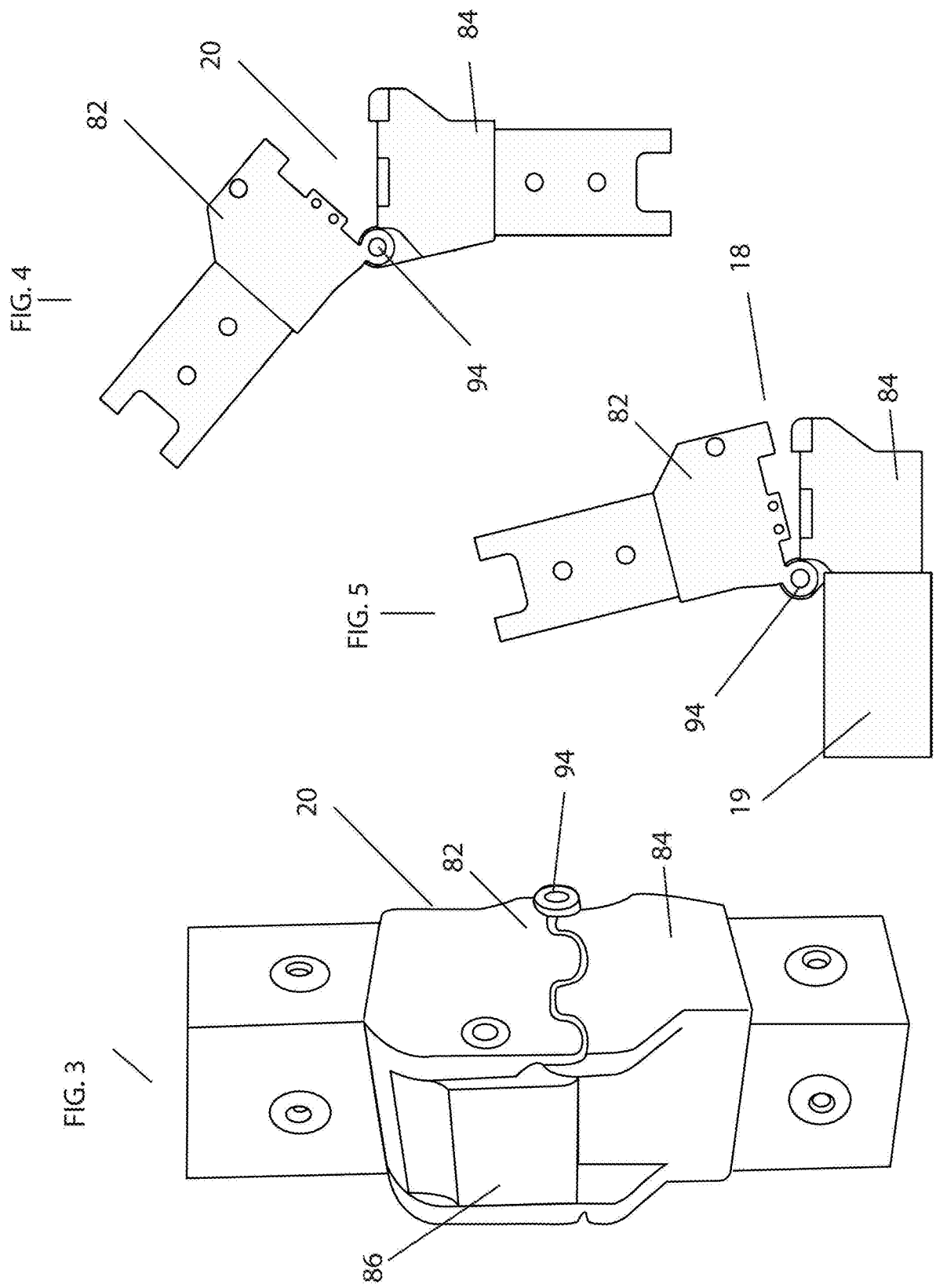

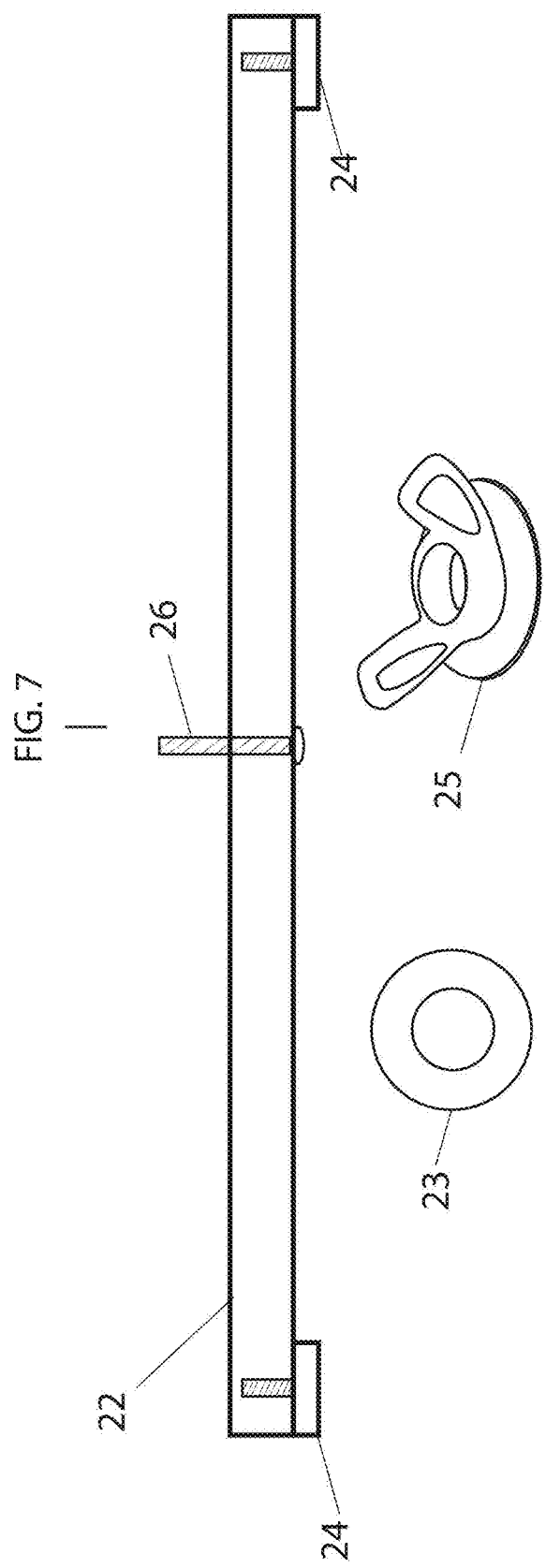

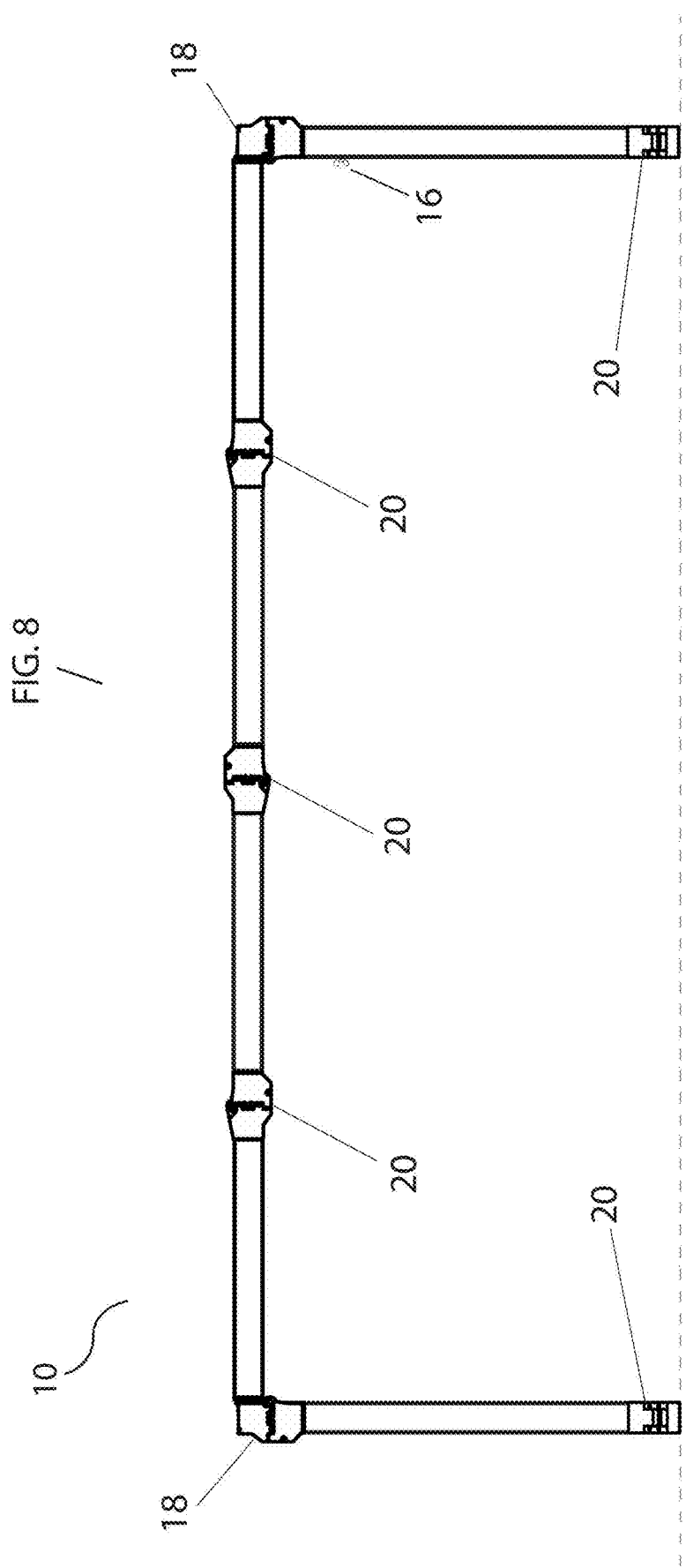

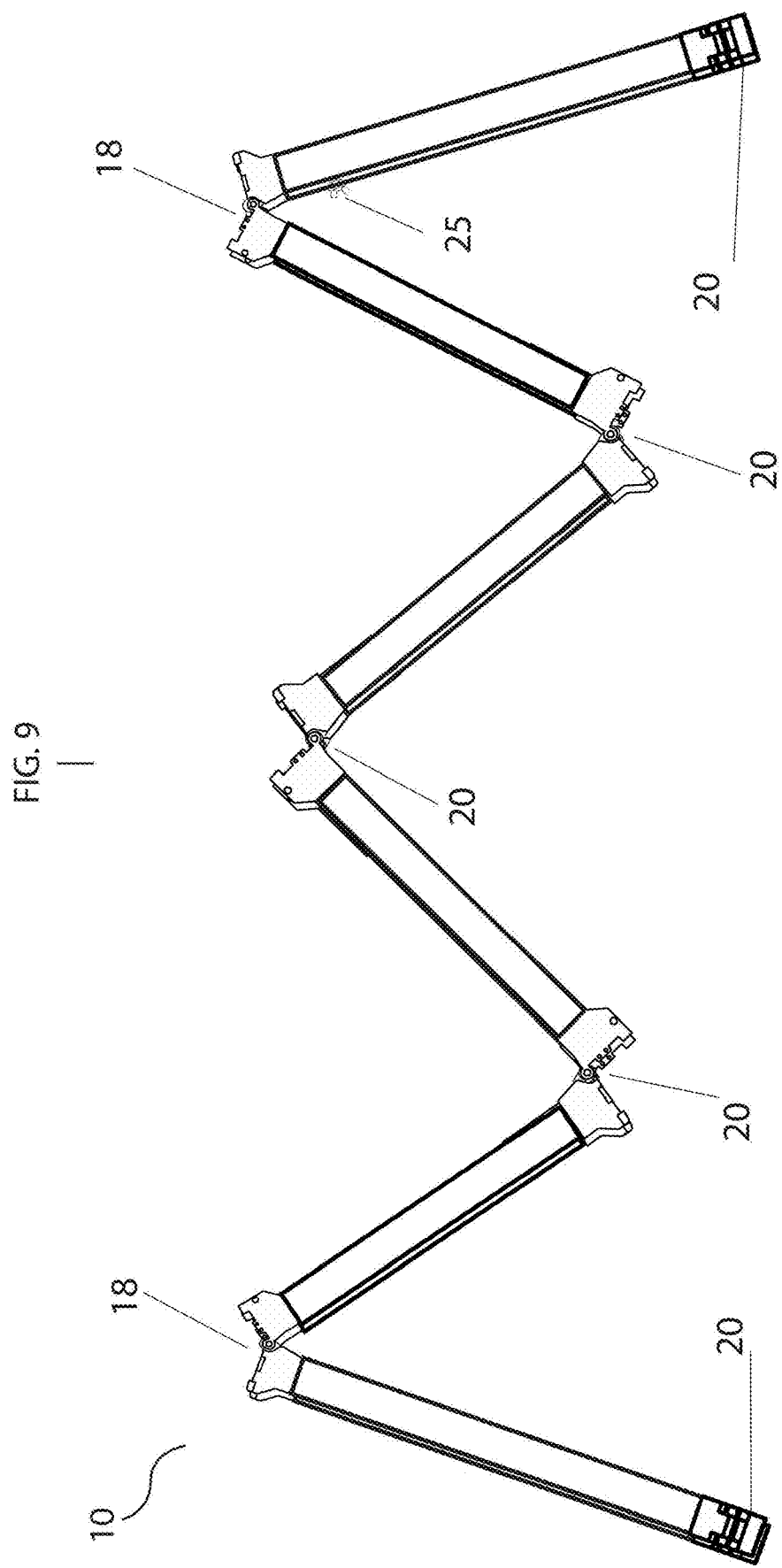

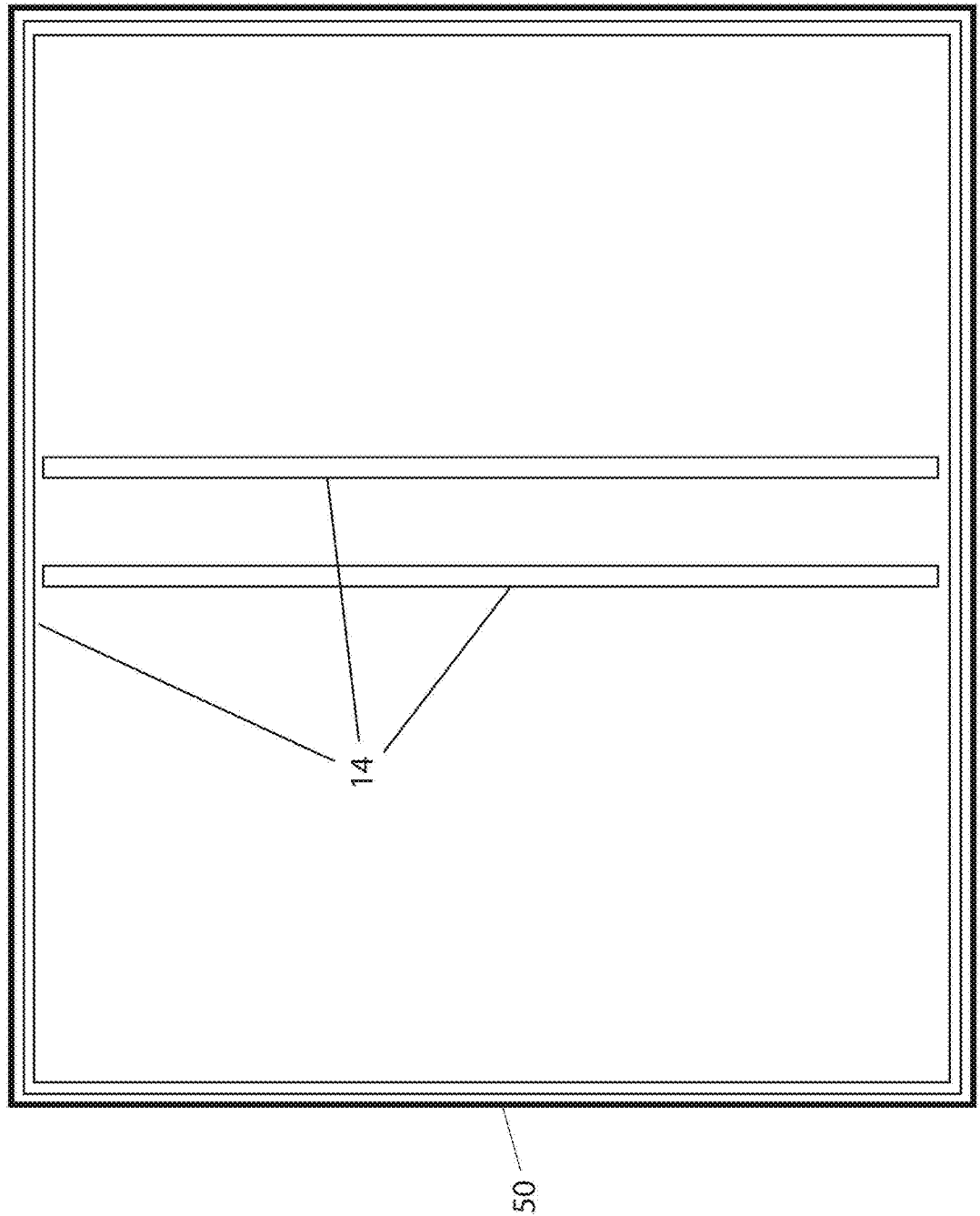

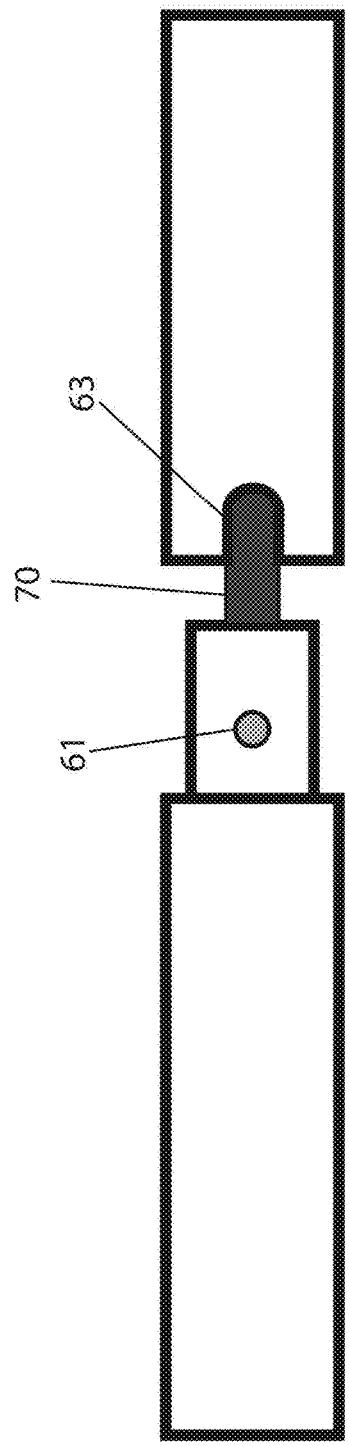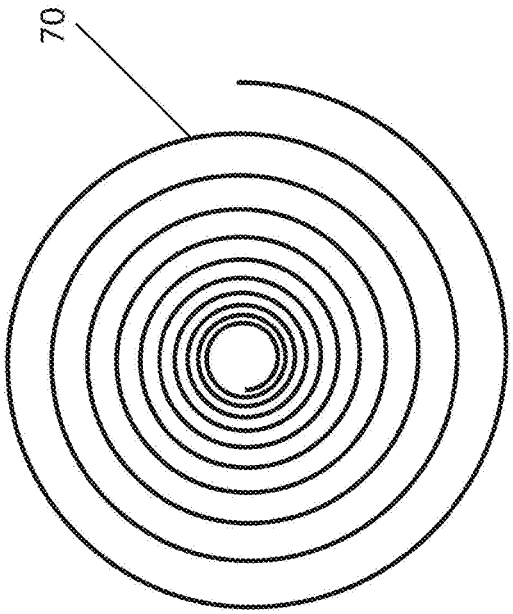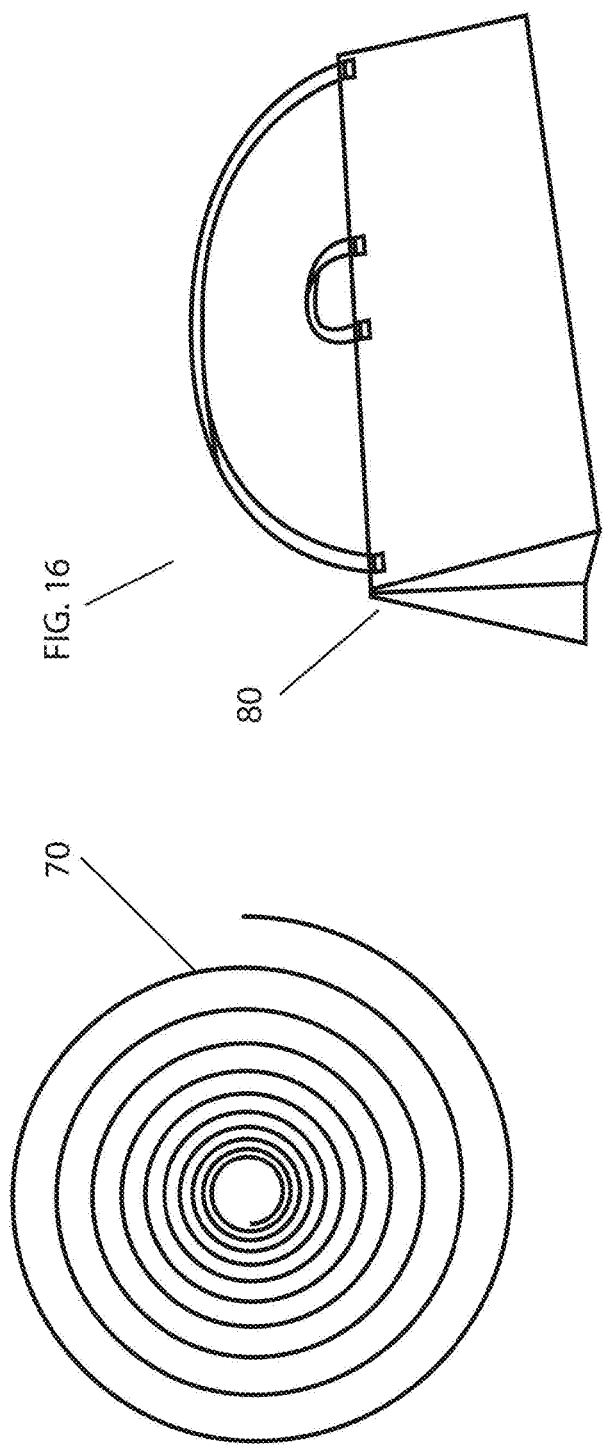

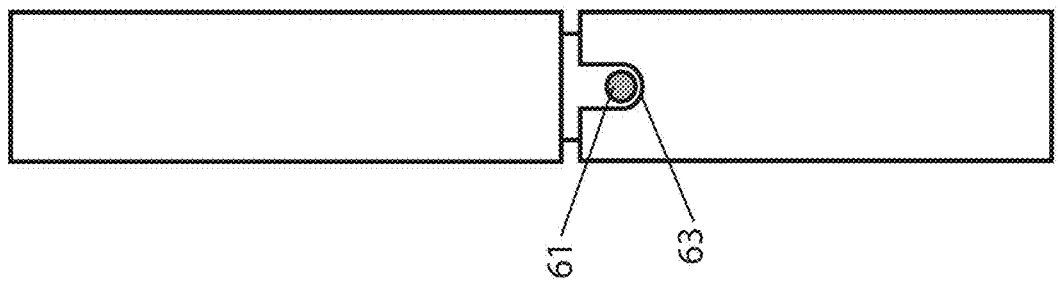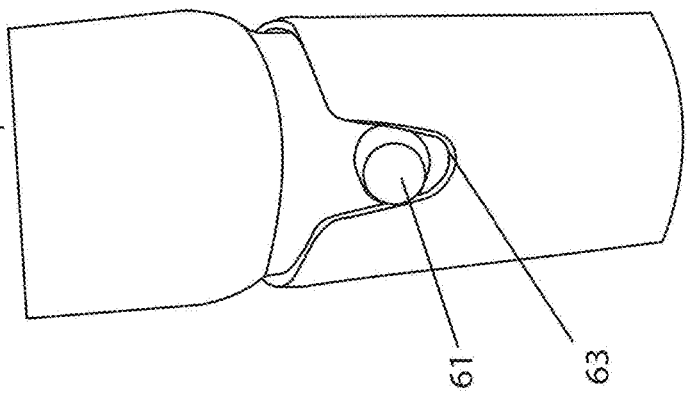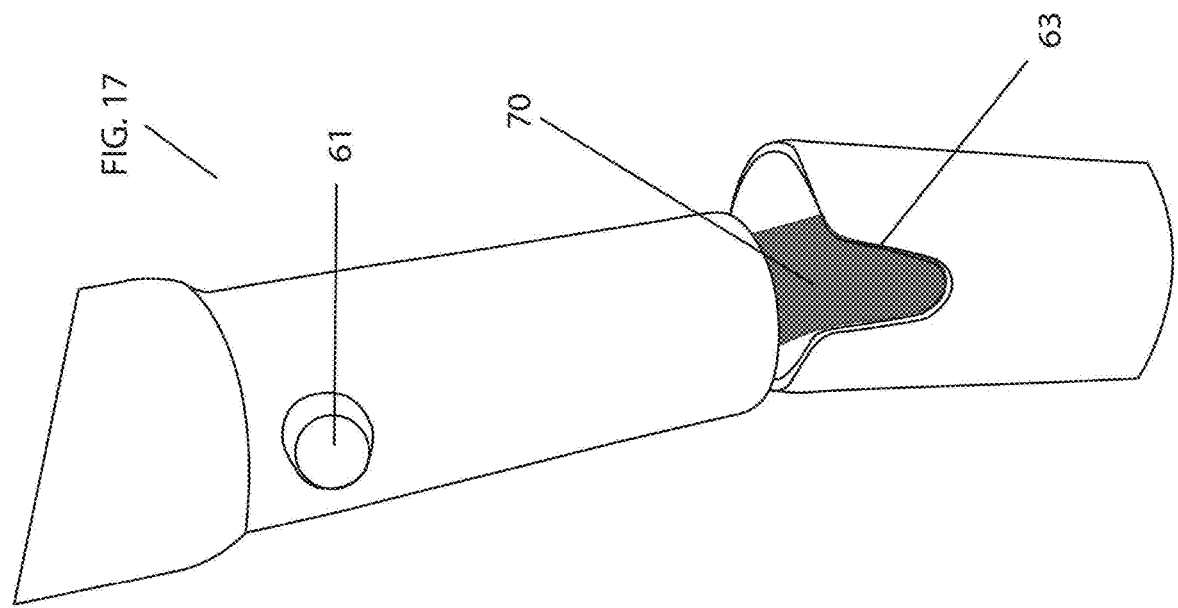

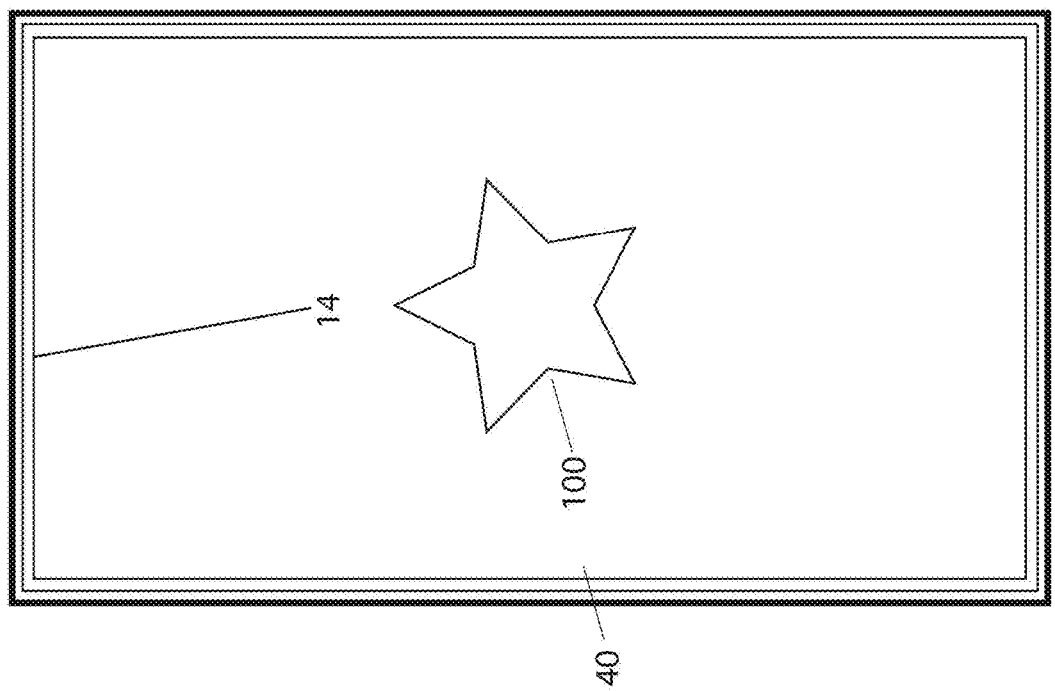
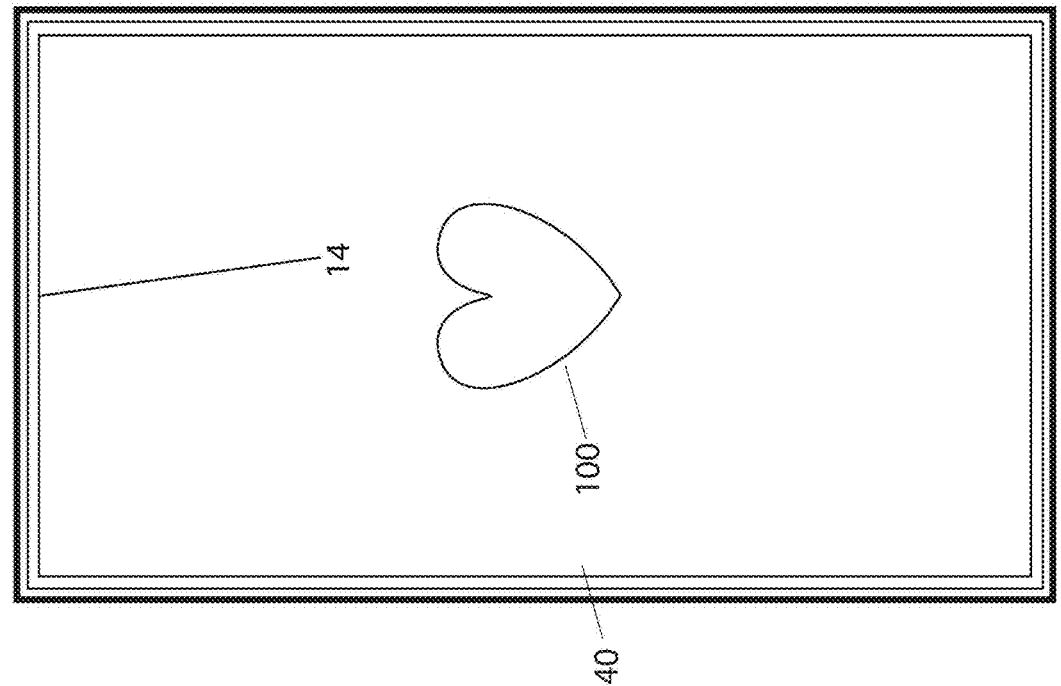

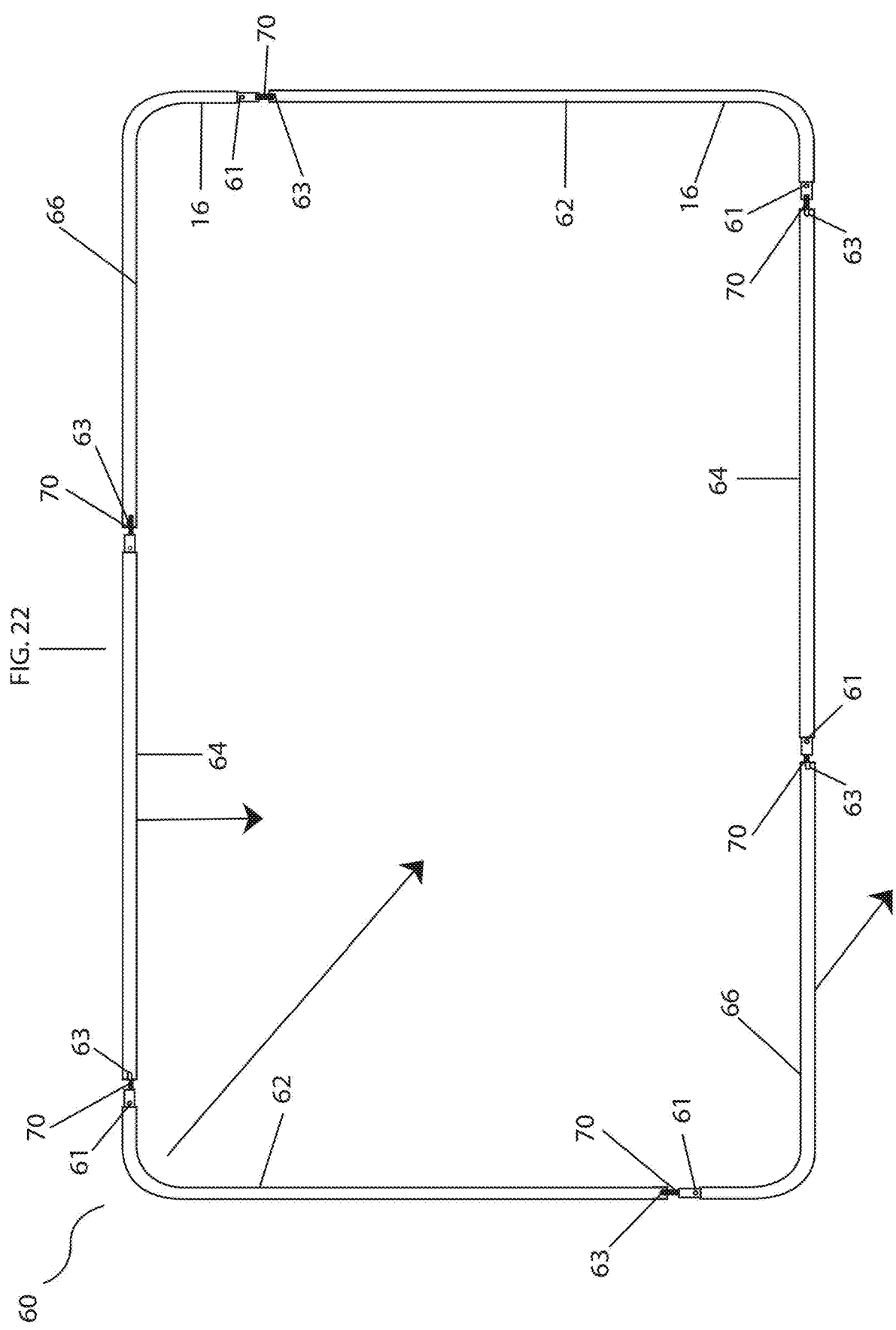

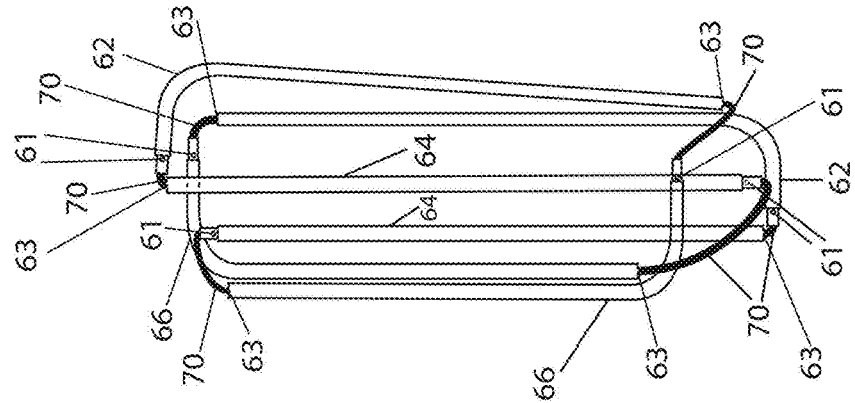
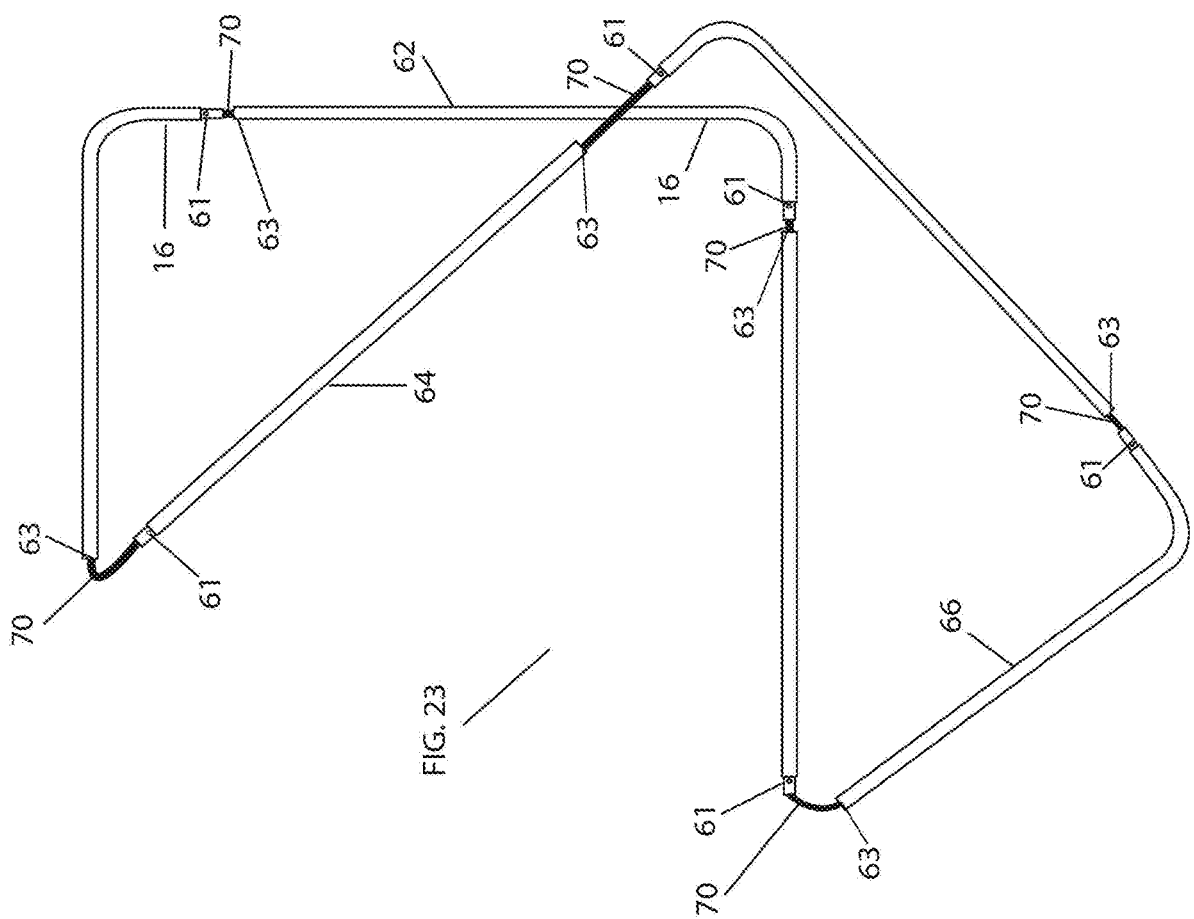

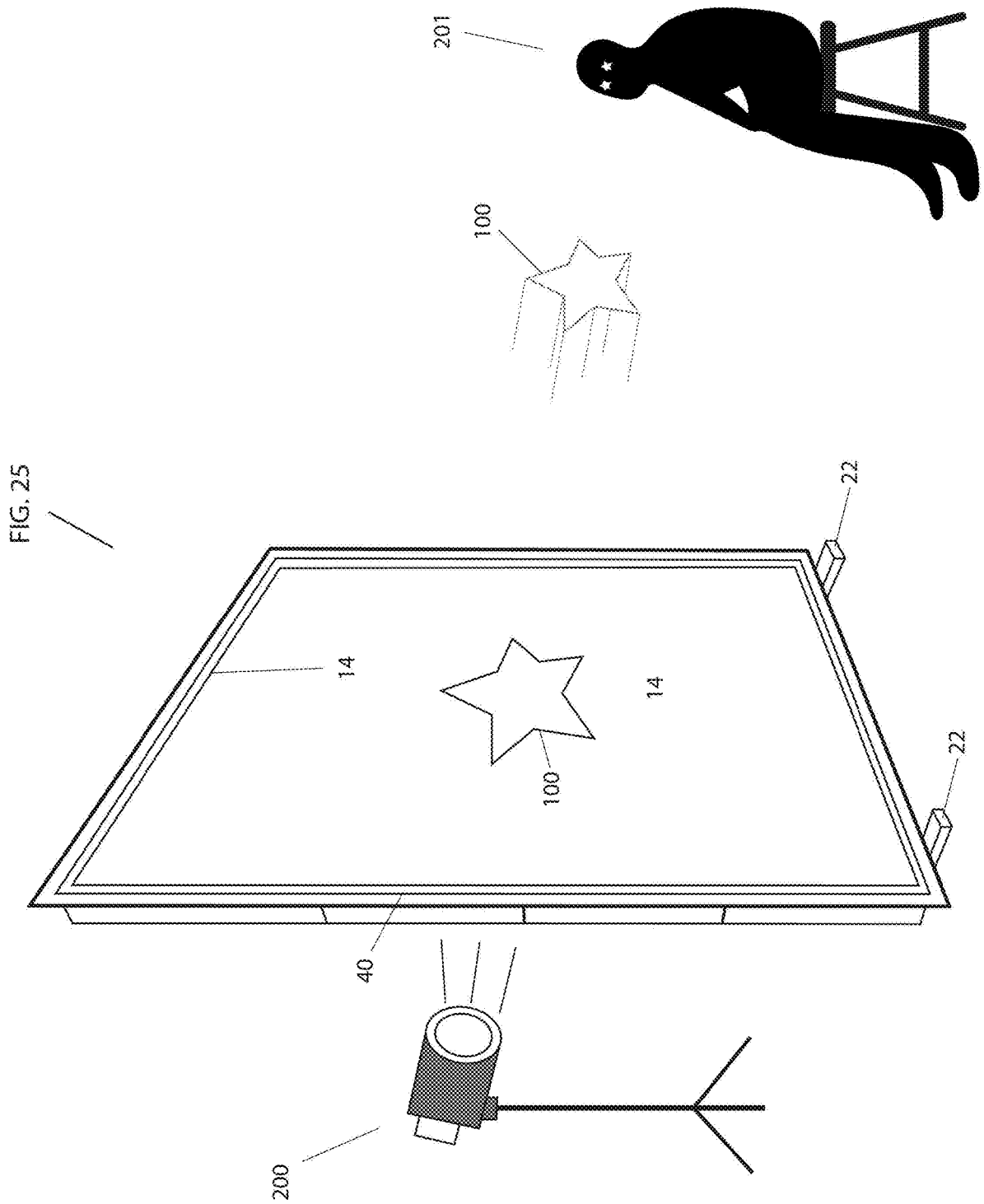

PORTABLE DEVICE FOR CONTROLLING PHOTOGRAPHY LIGHTING

CROSS-REFERENCE TO RELATED APPLICATIONS

This application claims priority to U.S. Provisional Patent Application 62/565,517, filed on Sep. 29, 2017, which is incorporated herein by reference.

FIELD OF THE INVENTION

The present invention relates to a portable lightweight and collapsible device for controlling lighting for use in photography or film. More particularly, the present invention relates to a versatile device that may be used as a reflector, a backdrop or a light-modifier.

BACKGROUND OF THE INVENTION

V-Flats are lightweight boards, typically white on one side and black on the other, that a photographer may use for different purposes. For example, a photographer may use the white side of the V-Flat board as a reflector to reflect light indirectly onto a subject. Alternatively, the photographer may use the black side of the board as a bounce board to draw light away from a subject. V-Flats also may be used as a backdrop. Typically these boards, though lightweight, are large foam core boards that are cumbersome and not portable.

SUMMARY OF THE INVENTION

The present invention is directed to a portable, versatile V-Flat system that provides several advantages over traditional V-Flats. For example, the present invention provides a portable V-Flat system comprising a collapsible frame and a removable fabric mounted on the frame. The V-Flat system of the present invention can be easily set up and dismantled. The collapsible frame may be folded into a small package and the removable fabric may be rolled or folded, making the portable V-Flat system of the present invention easy to transport, which allows the photographer to create a studio lighting effect anywhere.

Moreover, in accordance with the present invention, various interchangeable fabrics may be mounted on the collapsible frame to allow the photographer to use the portable V-Flat system for different purposes. For example, the photographer may use the portable V-Flat system as a reflector by mounting a reflective fabric onto the frame. Alternatively, the photographer may use the portable V-Flat system as a backdrop by mounting an appropriate background fabric onto the frame. The photographer also may use the portable V-Flat system as a light modifier by mounting a fabric with various cutout designs (e.g., star, heart, flower, etc.) onto the frame. The light modifier fabric containing cutouts may be used to create a unique shape for the catch light in the eyes or on the subject or background when projecting a natural or artificial light from the back of the frame through the cutout(s) while the subject is in front of the V-Flat frame.

In one embodiment, the present invention is directed to a device for controlling photography lighting. The device comprises a collapsible frame and a removable fabric. The collapsible frame comprises a plurality of frame segments alternating with a plurality of hinges to form a loop. Each of the plurality of hinges includes a corresponding lock to lock the hinge at an angle. The removable fabric may be attached to a plurality of attachment points along the frame when each of the plurality of locks is in the locked position. The device may include a foot to support the collapsible frame when each of the plurality of locks is in the locked position.

In a second embodiment, the present invention is directed to a device for controlling photography lighting. The device comprises a collapsible frame and a removable fabric. The collapsible frame comprises a plurality of frame segments alternating with a plurality of locks to form a loop. The removable fabric may be attached to a plurality of attachment points along the frame when each of the plurality of locks is in the locked position. Each of the plurality of frame segments may comprises a hollow rod and the collapsible frame may further comprise an elastic cord running through each of the plurality of hollow rods. The device may include a foot to support the collapsible frame when each of the plurality of locks is in the locked position.

The accompanying drawings, which are incorporated in and constitute a part of this specification, illustrate several embodiments of the present teachings and together with the description, serve to explain the principles of the present teachings. The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

BRIEF DESCRIPTION OF THE DRAWINGS

FIG. 1 is a perspective view of the square metal material the frame might be made of.

FIG. 2 is a front view of the frame and its possible locations of the hook and loop fabric.

FIG. 3 is a front perspective view of the one hundred eighty degree angle hinge and locking clip.

FIG. 4 is a side view of the one hundred eighty degree angle hinge.

FIG. 5 is a side view of the right angle hinge connected to the frame.

FIG. 7 is a view of the removable foot and its pieces.

FIG. 8 depicts the frame after it is folded in half.

FIG. 9 depicts how the frame folds after it has been folded in half and all of the hinges have been disengaged.

FIG. 12 is a rear view of the double reflector or backdrop fabric.

FIG. 14 is a close up view of the connection points on the tube style framing.

FIG. 15 is a view of the elastic cord that will be inside the tubing.

FIG. 16 is a side perspective view of a travel bag that would be capable of storing either of the present inventions.

FIG. 17 is a top down view of the connection points on the tube style framing.

FIG. 18 is a top down view of the tube style frame locking system being inserted together.

FIG. 19 is a front view of the tube style frame locking system being inserted together FIG. 20 is a sample of a design on the light modifier fabric that could be used to cast a unique shape(s) of highlights and/or shadows on a subject or background.

FIG. 21 is another variation of a design on the light modifier fabric that could be used to cast a unique shape(s) of highlights and/or shadows on a subject or background.

FIG. 22 is a front view of the frame showing how the frame collapses inward for folding.

FIG. 23 depicts the tube style frame showing how it folds together.

FIG. 24 depicts the tube style frame after it has been completely folded and is ready to store.

FIG. 25 is a side front perspective view of the light modifier fabric connected to the V-Flat frame and how it is used with an artificial light source to cast a unique shape of highlights and/or shadows on a subject.

DESCRIPTION OF THE INVENTION

Figure 6:
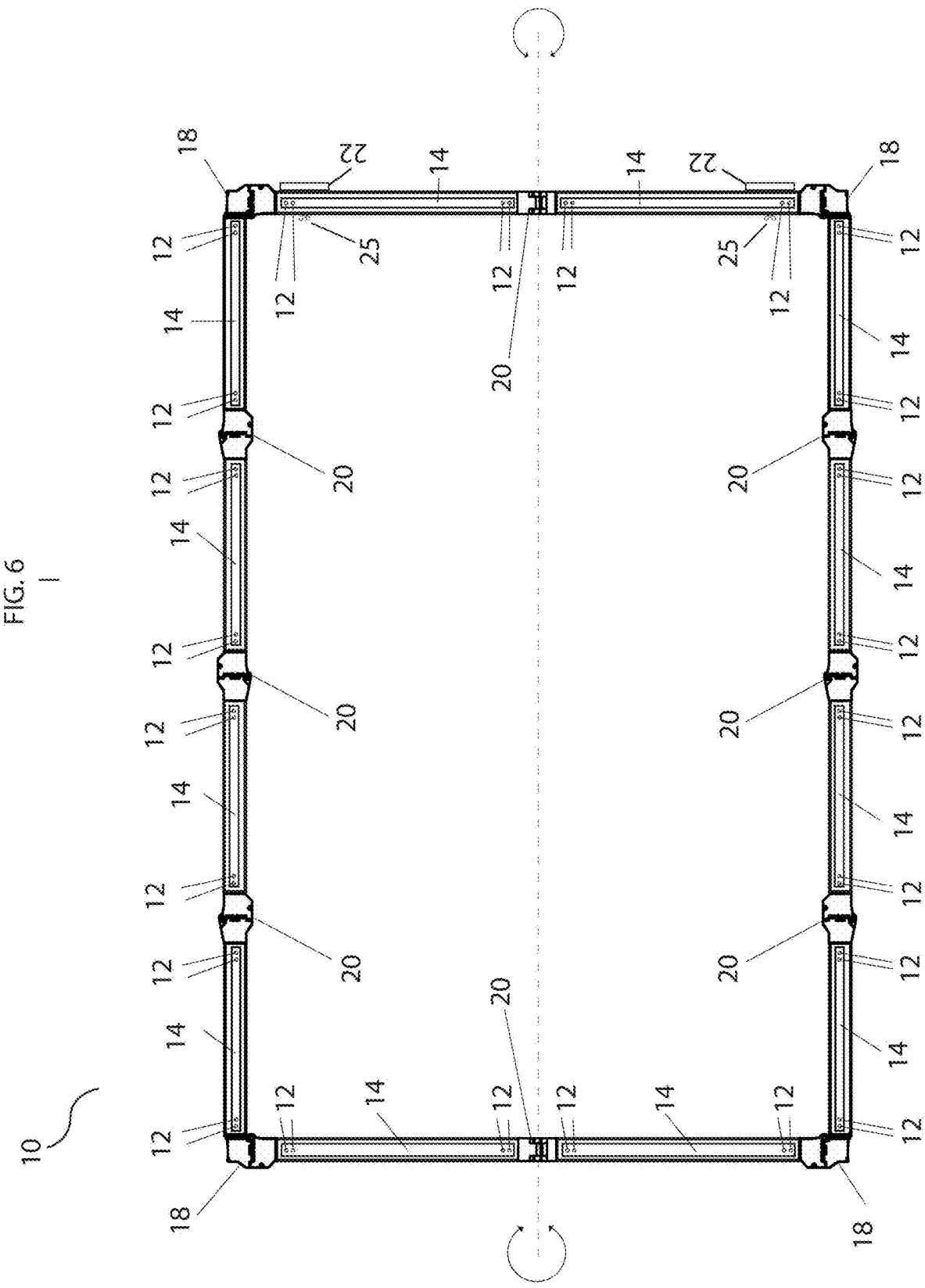
FIG. 6 is a front view of the frame showing how the middle folds inward.

Reference throughout this specification to "one embodiment," "an embodiment," "some embodiments," or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a," "an," and "the" are intended to include the plural forms as well, unless the context clearly indicates otherwise. Furthermore, the use of the terms "a," "an," etc., do not denote a limitation of quantity, but rather denote the presence of at least one of the referenced items. The term "set" is intended to mean a quantity of at least one. It will be further understood that the terms "comprises" and/or "comprising," or "includes" and/or "including," or "has" and/or "having," when used in this specification, specify the presence of stated features, regions, integers, steps, operations, elements, and/or components, but do not preclude the presence or addition of one or more other features, regions, integers, steps, operations, elements, components, and/or groups thereof.

Turning now descriptively to the drawings, in which similar reference characters denote similar elements throughout the several views, FIGS. 1 through 6 illustrate an example of the present inventive V-Flat system which may be comprised of a material that is durable (e.g. plastic, fiberglass, or any metal).

In accordance with a preferred embodiment of the present invention, V-Flat system comprises one or more rectangular frames 10 made of tubing 11. As depicted in FIG. 1, tubing 11 may be square and hollow inside. Other configurations are included within the scope of the invention.

FIG. 2 shows examples of the possible locations of a hook and loop fabric 14 that is attached to the frame 10, for example, with a standard rivet 12. It should be recognized that in some embodiments, more or fewer locations of hook and loop fabric 14 may be located around the frame.

FIGS. 3 through 5 illustrate one embodiment of a locking mechanism for hinges 18 and 20. As depicted, hinges 18 and 20 include a latching section 82 and a locking section 84. Latching section 82 includes a latching member 86 in the form of a press lock and release clip that locks in place once combined with locking section 84. A pin or rivet 94 pivotally connects latching section 82 to locking section 84.

To lock hinges 18 and 20 in the locked position, latching section 82 is manually rotated about pin 94 until latching member 86 locks into place on locking section 84. The lock may be disengaged by depressing the latching member 86, releasing it from the locking section 84. The right-angled hinge 18 may be derived from the one hundred eighty degree angle hinge 20 by welding solid aluminum tubing 19 to one hundred eighty degree angle hinge 20.

The locking hinges 18 and 20 in FIGS. 3 through 5 may be comprised of any suitable material or design, e.g., fiberglass, metal, with or without rubber or poly blended components.

FIG. 6 shows how the middle of the V-Flat frame 10 folds inward from the middle seams where the one hundred eighty degree angle hinges 20 are connected. FIG. 7 is a removable foot 22 with the middle screw 26 that goes into hole 16 on the frame 10 and is tightened, for example, using a washer 23 and a wingnut 25. The removable foot may include one or more non-slip pads 24 made of neoprene or rubber or similar material that screw or adhere onto the foot 22. Typically, at least two feet 22 will be included per frame, but in some embodiments, more or fewer than two may be included.

Figure 10:
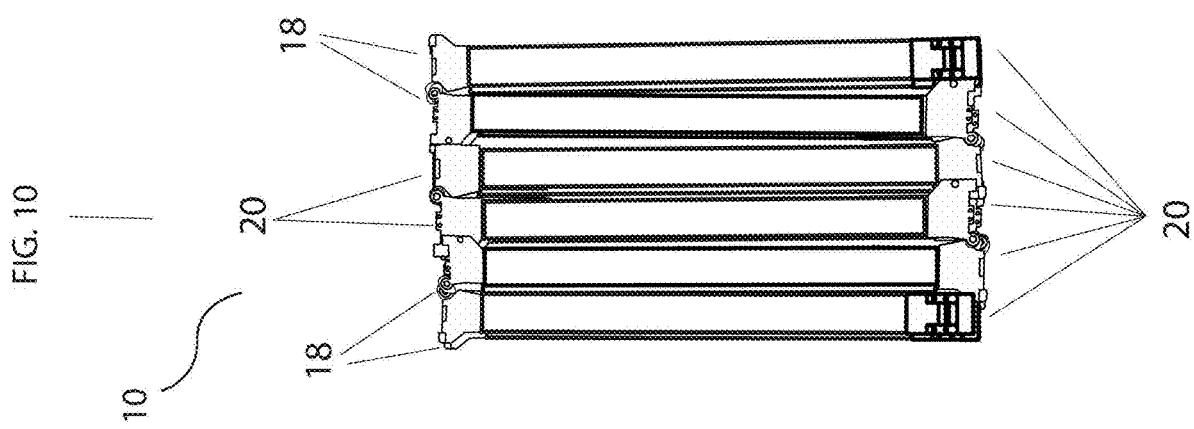
FIG. 10 depicts the frame after it has been completely folded and is ready to store.

FIG. 8 depicts the frame 10 after it is folded in half. FIG. 9 depicts how the frame 10 folds after it has been folded in half and all of the hinges have been disengaged. FIG. 10 depicts the frame 10 after it has been completely folded and is ready to store. It is designed to fold and stack into a portable size.

Figure 11:
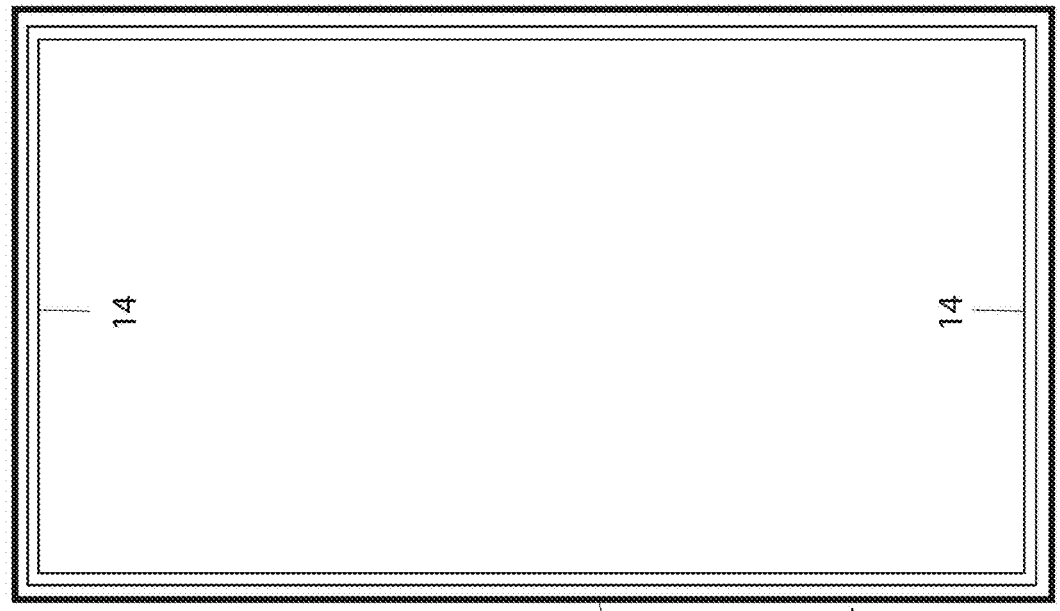
FIG. 11 is a rear view of the reflector or backdrop fabric.

The reflector or backdrop fabrics 40 and 50 in FIGS. 11 and 12 may be comprised of any vinyl, or fabric material (e.g. nylon and/or poly blended components). The fabric 40 is configured for attachment to a single V-Flat frame 10, while fabric 50 is configured for attachment to two adjacent V-Flat frames. Both fabrics 40 and 50 have hook and loop fabric 14 that attach to the hook and loop fabric on the frame 10.

Figure 13:
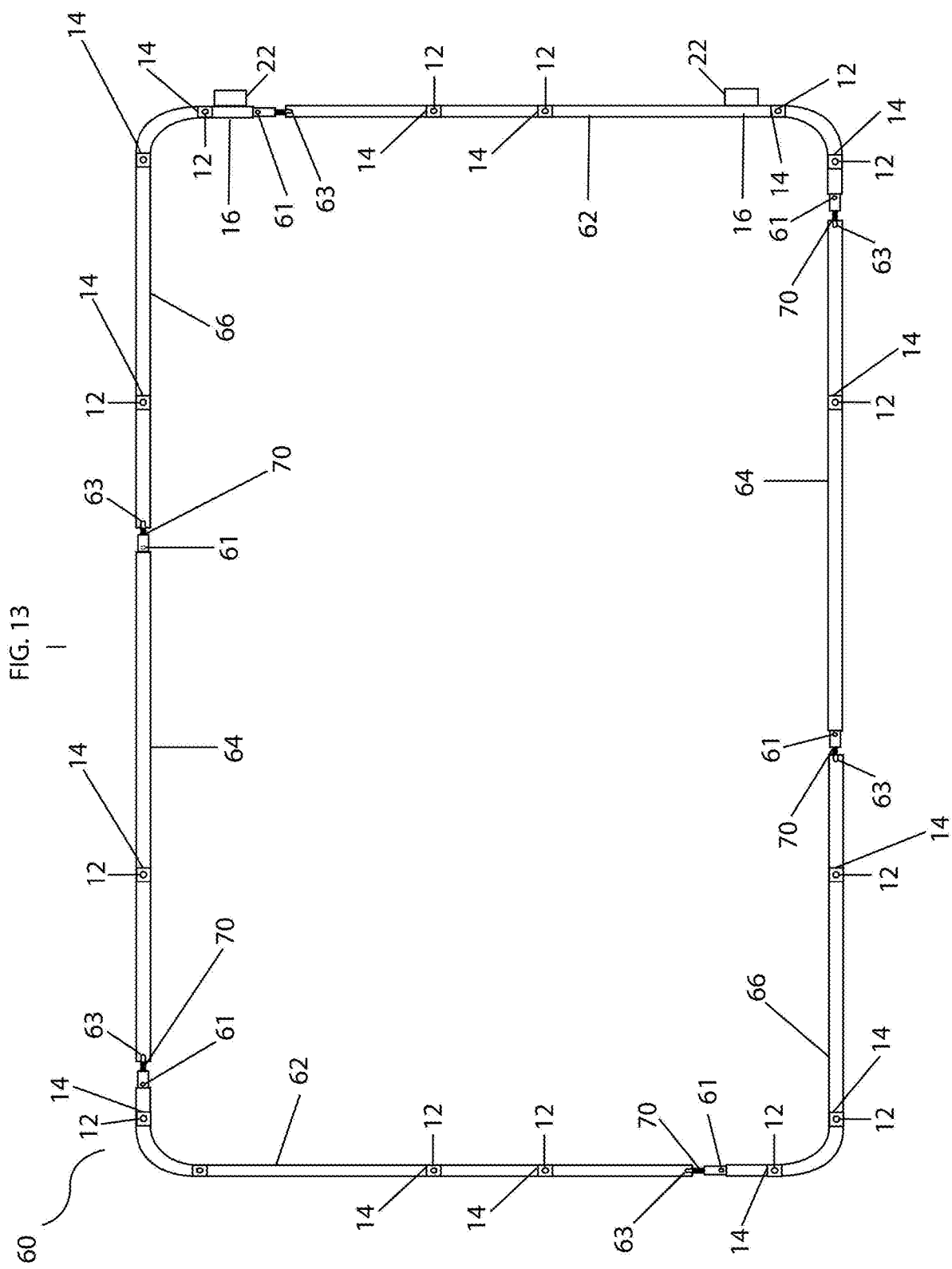
FIG. 13 is a front view of the tube style frame, its connection points and its possible locations of the hook and loop fabric

FIGS. 13 through 15 depict a variation of the V-Flat frame 60 which uses an elastic cord 70 in FIG. 15 inside tubing 62, 64 and 66. Tubing 62 and 66 include rounded corner sections while tubing 64 does not. The elastic cord is one continuous loop that runs through the entire length of the frame. The elastic cord inside the frame, once assembled, compresses the frame together to further keep the system together and sturdy. This variation uses a two-part locking system including locking part 61 and U-shaped opening 63, as depicted in FIGS. 14 and 15, to keep the tubing from swaying left and right and coming undone. The tubing with locking part 61 of the locking system is inserted into the tubing with the U-shaped opening 63 (shown in FIGS. 18 and 19). The locking part 61 fits inside the U-shape 63 and sits at the base of the U. This variation also includes the possible locations of a hook and loop fabric 14 that is attached to the frame. This variation may use the same removable feet 22 as in FIG. 7.

FIG. 16 is an example of a bag 80 that would be capable of storing embodiments of the present invention.

FIG. 17 is a top angle of how the second version V-Flat locking system looks when they are separated.

FIGS. 18 and 19 show how the second version V-Flat locking system 61 and 63 combine together to keep the frame tubing from turning left and right once assembled.

FIGS. 20 and 21 are of a design(s) 100 that can be cutout(s) in the light modifier fabric 40 or 50 in FIGS. 14 and 15. The light modifier fabric containing cutouts is used to create a unique shape for the catch light in the eyes or on the subject or background when projecting a natural or artificial light from the back of the frame through the cutout(s) while the subject is in front of the V-Flat frame.

The catch light is the reflection of light in the eyes or a reflective surface of what is being photographed or recorded. The cutout design(s) 100 on the fabric 40 or 50 can be of any amount or variation of a design(s) or image shown in FIGS. 21 and 22.

FIGS. 22 through 24 show how the second version of the V-Flat system frame 60 collapses and folds together for portability.

FIG. 25 shows how the light modifier fabric connects to the V-Flat frame and how it is used with an artificial light source 200 to cast a unique shape of highlights and or shadows on a subject 201.

OPERATION OF THE INVENTION

The present invention is removed from the travel bag, if stored in one. From its stored position (as depicted in FIG. 10), the frame 10 of the V-Flat system is spread out and unfolded (as depicted in FIGS. 8 and 9) until it is in the fully opened position (as depicted in FIG. 6). Once in this position, the feet 22 are connected to the bottom of the frame 10 with screw 26 in the designated hole 16. Once the screw 26 is inserted into hole 16, it is then tightened using the washer 23 and wingnut 25 as in FIG. 7. Two feet may be attached in some embodiments.

Once the feet 22 are connected to the V-Flat frame 10 and the hinges 18 and 20 in FIGS. 3 through 5 are locked in place, the frame 10 is set upright as shown in FIG. 2. The fabric reflector or backdrop fabric 40 is then attached to frame 10 with the loop and hook fabric 14.

Alternatively, two frames may be constructed and placed side by side. Once both frames are safely assembled, the reflector or backdrop fabric 50 may be attached to frames 10 with the loop and hook fabric 14.

The second variation of the V-Flat system frame 60 in FIG. 13 is spread out and unfolded from its stored position (FIG. 24). Once the frame is in its opened position as in FIG. 13, tubing 62, 64 and 66 are then connected together using the button locking system 61 and 63 in FIG. 14. Once connected, the feet 22 are connected to the bottom of the frame 60 with screw 26 in the designated hole 16. Once the screw 26 is inserted into 16, it is then tightened using the washer 23 and wingnut 25 as in FIG. 7. In some embodiments, two feet may be attached.

Once the feet 22 are connected to the V-Flat frame 60, the frame 60 is set upright. Once set upright safely, the fabric reflector or backdrop 40 is attached in place to frame 60 with the loop and hook fabric 14.

To use the catch light variation of the light modifier fabric 40, it is attached to the frame in the same manner as the reflector or backdrop fabric. A natural or artificial light 200 is positioned behind the light modifier fabric for the purposed of illuminating the cutout shape(s) onto the subject or background in front of the V-Flat system as depicted in FIG. 25.

While the disclosure has presented exemplary embodiments, it will be appreciated that variations and modifications will occur to those skilled in the art. In particular regard to the various functions performed by the above described components, the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention. Although some of the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated.

I claim:

1. A device for controlling photography lighting, comprising:

a collapsible frame comprising a plurality of frame segments alternating with a plurality of hinges to form a loop, wherein each of said hinges pivotally joins adjacent frame segments together in end-to-end relation, and each of the plurality of hinges includes a corresponding lock, which is lockable to lock the hinge at an angle wherein said frame forms said loop, and is disengagable to unlock said hinge and permit folding of said adjacent frame segments one against the other in parallel relation to collapse said frame to a completely folded condition for storage;

said frame configured in said loop comprising at least four edge sections defining opposite front and back faces of said frame, and said edge sections further defining interior and exterior loop edges extending about a periphery of said frame, at least a pair of said edge sections of said frame having respective said hinges which define respective first pivot axes oriented in alignment with each other and generally parallel to a common one of said front and back faces so that said frame is foldable to form a pair of parallel loop sections disposed in face-to-face relation, each remaining one of said edge sections having at least one said hinge which defines a respective second pivot axis oriented perpendicular to said front and back faces to allow folding of said adjacent frame segments to said completely folded condition, said second pivot axes being defined on both said interior and exterior loop edges, wherein said second pivot axes alternate on said interior and exterior loop edges to permit folding of said frame segments one next to another in parallel relation; and a removable fabric, wherein the removable fabric may be attached to a plurality of attachment points along the frame when each of the plurality of locks is in the locked position.

2. The device of claim 1, wherein the removable fabric comprises one of a reflective material and an absorptive material.

3. The device of claim 1, wherein the removable fabric comprises a light modifier.

4. The device of claim 3, wherein the light modifier includes a cut-out.

5. The device of claim 1, further comprising a foot to support the collapsible frame when each of the plurality of locks is in the locked position.

6. A device of claim 1, wherein said first pivot axes extend face-wise between said interior and exterior loop edges.

7. A device for controlling photography lighting, comprising:

a collapsible frame comprising a plurality of frame segments alternating with a plurality of hinges having locks to form a loop defining a face plane across one face of said frame, said hinges defining first hinge axes on opposite ends of said loop which are oriented to extend along said face plane to allow said loop to be folded in half, and second hinge axes on opposite side edges extending between said opposite ends, wherein said second hinge axes are oriented transverse to said face plane and each said first hinge axis so as to allow said frame segments of said loop to be collapsed together in side-by-side relation, each of said frame segments of the plurality of frame segments comprising a hollow rod and said collapsible frame further comprising an elastic cord running through each of the plurality of hollow rods wherein said elastic cord is elastically flexible to define said first and second hinge axes; and a removable fabric, wherein the removable fabric may be attached to a plurality of attachment points along the frame when each of the plurality of locks is in the locked position and said fabric lies in said face plane and extends over said loop.

8. The device of claim 7, wherein the removable fabric comprises a reflective material.

9. The device of claim 7, wherein the removable fabric comprises an absorptive material.

10. The device of claim 7, wherein the removable fabric comprises a light modifier.

11. The device of claim 10, wherein the light modifier includes a cut-out.

12. The device of claim 7, further comprising a foot to support the collapsible frame when each of the plurality of locks is in the locked position.

13. A device for controlling photography lighting, comprising:

a collapsible frame comprising a plurality of frame segments alternating with a plurality of hinges to form a loop, wherein each of said hinges pivotally joins adjacent frame segments together in end-to-end relation, and each of the plurality of hinges includes a corresponding lock, which is lockable to lock the hinge at an angle wherein said frame forms said loop, and is disengagable to unlock said hinge and permit folding of said adjacent frame segments one against the other in parallel relation to collapse said frame to a completely folded condition for storage;

said frame configured in said loop comprising at least four edge sections defining opposite front and back faces of said frame, at least a pair of said edge sections of said frame having respective said hinges which define respective first pivot axes oriented in alignment with each other and generally parallel to a common one of said front and back faces so that said frame is foldable to form a pair of parallel loop sections disposed in face-to-face relation, each remaining one of said edge sections having at least one said hinge which defines a respective second pivot axis oriented perpendicular to said front and back faces to allow folding of said adjacent frame segments to said completely folded condition, said frame including at least one foot which is pivotable between a use position oriented transverse to said frame segments to support said frame in an upright orientation, and a stored position parallel to said frame segments; and a removable fabric, wherein the removable fabric may be attached to a plurality of attachment points along the frame when each of the plurality of locks is in the locked position.

* * * * *